US011560227B2

(12) United States Patent
Sababha et al.

(10) Patent No.: US 11,560,227 B2
(45) Date of Patent: Jan. 24, 2023

(54) UNMANNED AERIAL VEHICLE

(71) Applicant: PRINCESS SUMAYA UNIVERSITY FOR TECHNOLOGY, Amman (JO)

(72) Inventors: Belal Hussein Sababha, Amman (JO); Hamzeh Mahmoud Alzu'bi, Amman (JO); Osamah Ahmad Rawashdeh, Rochester Hills, MI (US)

(73) Assignee: PRINCESS SUMAYA UNIVERSITY FOR TECHNOLOGY, Amman (JO)

( * ) Notice: Subject to any disclaimer, the term of this patent is extended or adjusted under 35 U.S.C. 154(b) by 996 days.

(21) Appl. No.: 16/280,410

(22) Filed: Feb. 20, 2019

(65) Prior Publication Data

US 2019/0185160 A1 Jun. 20, 2019

Related U.S. Application Data

(62) Division of application No. 15/245,546, filed on Aug. 24, 2016, now abandoned.

(51) Int. Cl.
*B64C 39/02* (2006.01)
*G05D 1/08* (2006.01)
(52) U.S. Cl.
CPC ......... *B64C 39/024* (2013.01); *G05D 1/0816* (2013.01); *G05D 1/0858* (2013.01); *B64C 2201/027* (2013.01); *B64C 2201/108* (2013.01); *B64C 2201/14* (2013.01)
(58) Field of Classification Search
CPC ............ B64C 39/024; B64C 2201/027; B64C 2201/108; B64C 2201/14; G05D 1/0816; G05D 1/0858
See application file for complete search history.

(56) References Cited

U.S. PATENT DOCUMENTS 9,919,797 B2 * 3/2018 Chan ................. B64C 39/024

FOREIGN PATENT DOCUMENTS

WO WO-2007124014 A2 * 11/2007 ............. G05D 1/101

OTHER PUBLICATIONS

"Ningjun Liu, An L1 adaptive roll and pitch angle controller for quadrotors, Aug. 8, 2016, IEEE, 2473-2478" (Year: 2016).*
"Hamzeh Alzu'bi, Model-Based Control of a Fully Autonomous Quadrotor UAV, Aug. 22, 2013, American Institute of Aeronautics and Astronautics, 1-6" (Year: 2013).*
English Translation of WO-2007124014-A2 (Year: 2007).*

* cited by examiner

*Primary Examiner* — Anshul Sood
*Assistant Examiner* — Matthew Ho
(74) *Attorney, Agent, or Firm* — Oblon, McClelland, Maier & Neustadt, L.L.P.

(57) ABSTRACT

A vertical take-off and landing ("VTOL") unmanned aerial vehicle ("UAV") system and a method of controlling the same, wherein such method controls the stability and maneuverability of the VTOL UAV by manipulating the speeds of the propellers at each rotor. The VTOL UAV includes a body with three extending arms, wherein each of such arms is aligned and fixed at a certain angle from a central axis passing through the body. Each extending arm is equipped with a rotor with propellers. The rotors are sufficient to control the yaw of the UAV, and there is no need for coaxial rotors or an extra servo-motor in order to control the yaw of the UAV, thus reducing the cost and the weight of the UAV.

19 Claims, 5 Drawing Sheets

UNMANNED AERIAL VEHICLE

This application is a divisional of and claims priority to U.S. Nonprovisional patent application Ser. No. 15/245,546, filed Aug. 24, 2016, which is hereby incorporated by reference herein.

TECHNICAL FIELD

The present disclosure relates in general to an Unmanned Aerial Vehicle ("UAV") and in particular to a UAV in which the stability and maneuvering is achieved by manipulating the rotational speeds of a plurality of propellers.

BACKGROUND

An unmanned aerial vehicle ("UAV") is an aircraft that manipulates aerodynamic forces to provide lift without an onboard human operator. Generally, UAVs can be flown autonomously or piloted remotely. UAVs are able to carry payloads depending on their power plant. A vertical takeoff and landing ("VTOL") UAV is an aircraft that is capable of VTOL from a static or dynamic position. VTOL aircraft have the ability to transition between movement phases including vertical takeoff, hover, lateral movement, and landing. Multi-rotor UAVs are VTOLs that have recently emerged. Such UAVs make use of more than one rotor to function. Tricopters (a.k.a. tri-rotors) are a special version of multi-rotor UAVs that engages three rotors. Tri-rotor VTOL UAVs fall mainly into two categories. In the first, UAVs are equipped with three coaxial rotors. Each motor in every coaxial rotor in this configuration rotates in the opposite direction of the other to cancel the yaw moment generated by every motor within the coaxial rotor assembly. In the other category, UAVs have three single rotors with a single servo-motor for one of the rotors. The servo-motor is used to change the lifting angle of one of the three single rotors. Turning the rotor clockwise or counterclockwise by the control loop will change the yaw of the vehicle. In both configurations, the main goal is to stabilize the yaw moment of the vehicle.

The coaxial and tilting servo-motor configuration approaches, however, require additional precision moving parts that increase the complexity of the mechanical design. In addition, these extra mechanical components (i.e., coaxial rotors or servo-motor) add overhead cost and weight.

Kataoka et al. studied a tri-rotor UAV system with only three motors that are all mounted on the three arms of the UAV with fixed tilt angles (Kataoka et al., "Nonlinear Control and Model Analysis of Trirotor UAV Model," 18th IFAC World Congress, Aug. 28-Sep. 2, 2011). The authors showed that the hovering control of a system with only three inputs (the three motors, in this case) is impossible.

SUMMARY

Embodiments of the present disclosure provide an Unmanned Aerial Vehicle ("UAV") using only three propellers, which may be a Vertical Take-off and Landing ("VTOL") UAV.

Embodiments of the present disclosure provide a UAV system in which yaw is adjusted to enable lateral maneuvering with minimal pitch alternation that does not affect the UAV's stability.

Embodiments of the present disclosure provide a method for controlling the stability and maneuvering ability of a UAV by manipulating the speeds of the three installed propellers.

Aspects of the present disclosure provide a low cost and low weight UAV compared to the conventional solutions.

Aspects of the present disclosure provide a method for controlling the balance (roll, pitch, and yaw) of a UAV and making such UAV capable of hovering and lateral maneuvering.

Aspects of the present disclosure provide a tri-rotor UAV system having a front portion and a rear portion separated by a line of symmetry, wherein the main body has three horizontal arms extending radially therefrom, wherein two of the arms extend in a front portion, and one of the arms extends in a rear portion, and wherein each of the arms has at an end a rotor containing a DC motor, a propeller, and a base, and wherein the main body encloses a plurality of Proportional-Integral-Differential ("PID") controllers, and a plurality of command mixers.

In aspects of the present disclosure, the rotors extending in the front portion rotate in a similar direction, while the rotor extending in the rear portion rotates in an opposite direction, such that adverse torque forces and gyroscopic moment forces are reduced or even cancelled. This leads to yaw moment control. The rotational speed difference between the two front rotors produces the roll moment, while the pitch moment is created due to the variation of speed between the rear rotor and the front two rotors collectively.

In aspects of the present disclosure, the rotors have equivalent initial rotational speeds.

In accordance with aspects of the present disclosure, the rotors in the front portion produce a similar amount of torque and lift while the rotor in the rear portion produces twice the amount of torque produced by either rotor in the front portion.

According to aspects of the present disclosure, the base fixes the DC motor to the arm.

In aspects of the present disclosure, the plurality of PID controllers control a set of parameters including altitude, roll, pitch, and yaw of the system.

In accordance with aspects of the present disclosure, the plurality of PID controllers are four, each controlling at least one parameter of a set of parameters, and wherein execution rates of roll and pitch control loops are equivalent, and have higher rates than a yaw control loop.

According to aspects of the present disclosure, the command mixers are three, and mix outputs of the PID controllers, wherein the mixed outputs are transmitted to a plurality of rotor controllers.

Aspects of the present disclosure provide a method for controlling a UAV system include comparing, by at least one controller, a plurality of actual parameters versus a plurality of desired parameters; identifying, by the at least one controller, correction values for the compared parameters; mixing, by at least one command mixer, the correction values; and communicating the mixed values at the at least one command mixer to a corresponding rotor controller.

In aspects of the present disclosure, the parameters include altitude, roll, pitch, and yaw of the system.

According to aspects of the present disclosure, the actual parameters are obtained from a plurality of sensors comprising gyroscopes, accelerometers, sonar, and pressure sensors.

In accordance with aspects of the present disclosure, the desired parameters are pre-set by an operator (for example, remote pilot, or autopilot).

In aspects of the present disclosure, the correction values are a result of a difference between values of the desired and actual parameters after being subjected to a PID control loop.

According to aspects of the present disclosure, a first command mixer adds an altitude correction value and subtracts roll, pitch, and yaw correction values.

In aspects of the present disclosure, a second command mixer adds up roll and altitude correction values but subtracts pitch and yaw correction values.

In aspects of the present disclosure, a third command mixer adds up pitch, yaw, and altitude correction values and disregards a roll correction value.

In embodiments of the present disclosure, the UAV is configured to achieve maneuverable flight using only three single rotors each positioned on arms of the UAV that extend from a main body of the UAV. The three single rotors are not coaxial rotors. Such a UAV may also be configured to achieve maneuverable flight without the use of any servomotors to control the yaw of the UAV. The yaw moment control is achieved by only manipulating the rotational speeds of the propellers at each rotor, without the use of any conventional mechanical components for dynamically tilting motor(s) (e.g., a servo-motor).

Such a UAV may be configured with no servo-motors coupled to any of the single rotors.

Embodiments of the present disclosure provide UAV design that only employs three brushless DC motors with three fixed pitch propellers for propulsion and flight control. The design of the UAV in accordance with embodiments of the present disclosure is different than the one presented in Kataoka et al. (previously referenced herein) by not having the fixed tilt angles for any of the three rotors. No additional mechanics for dynamically tilting motor(s), found on existing tricopters, are used. A control strategy to control the stability and maneuvering of the UAV is achieved by only manipulating the rotational speeds of the propellers at each rotor. Two of the rotors rotate in the same direction while the third rotates in the opposite direction. The control methodology is novel compared to other systems that require either coaxial rotors or an extra servo-motor to control the yaw of the UAV. Results show that the UAV design achieved stable flight with minimal position-attitude cross control effect. The fixed nature of the rotors in the UAV design, reduced mechanical requirements and cost compared to existing vehicles of its type.

BRIEF DESCRIPTION OF THE DRAWINGS

The disclosure will now be described with reference to the accompanying drawings without restricting the scope of the disclosure thereof, and in which.

DETAILED DESCRIPTION

Figure 1:
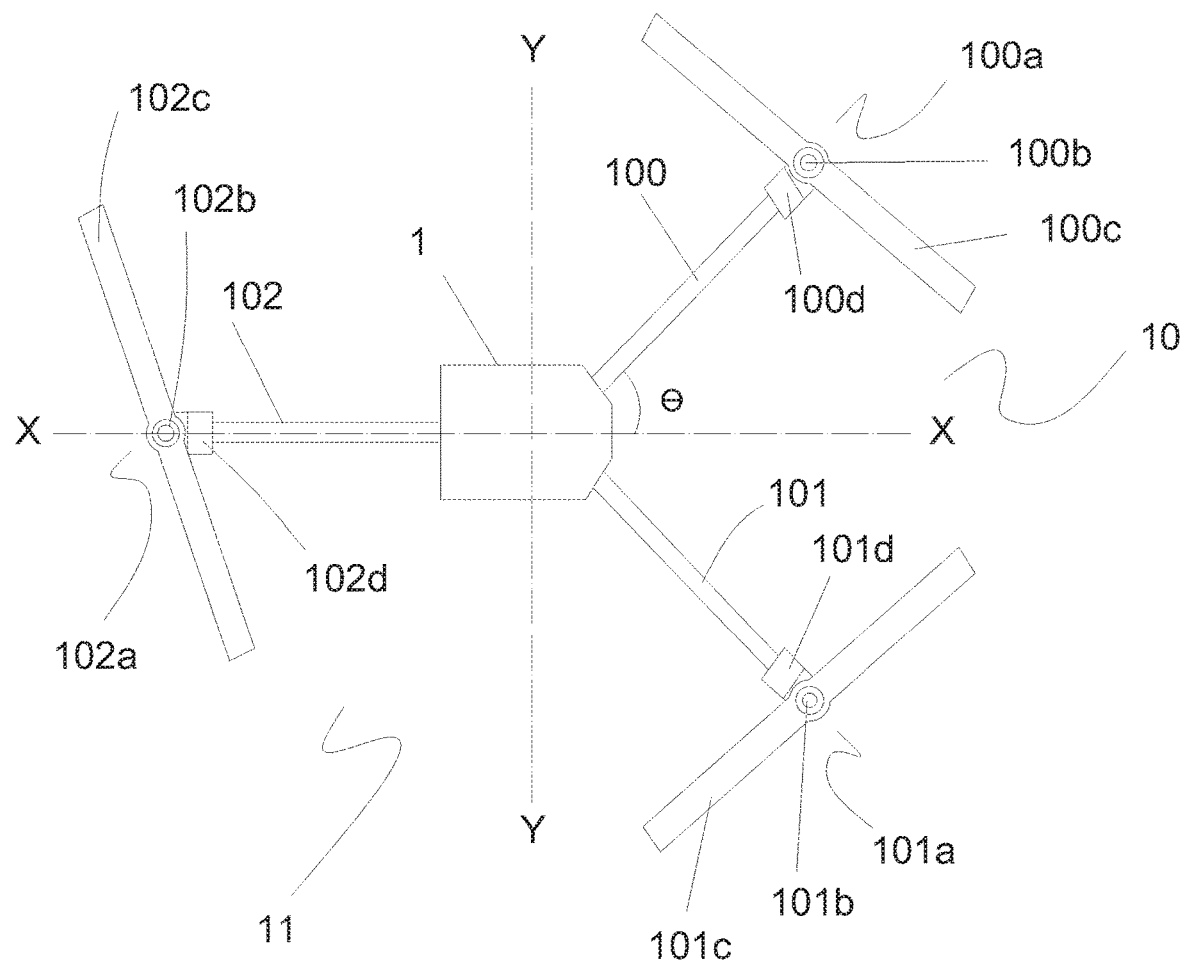
FIG. 1 illustrates a top view of a UAV system configured in accordance with embodiments of the present disclosure.

FIGS. 1, 2, 3A, and 3B illustrate a UAV system, configured according to embodiments of the present disclosure. The UAV system in embodiments of the present disclosure includes a main body 1 enclosing a cavity (not shown). The main body 1 has a front portion 10 and a rear portion 11; the front and rear portions 10, 11 are illustrated in FIG. 1 as being separated by a central axis Y-Y. Three arms 100, 101, and 102 (which may be configured substantially identical to each other) extend radially outwardly from the main body 1, wherein the arms 100, 101, and 102 are aligned and fixed at one or more certain angles from a central axis X-X (axis X-X represents a line of symmetry bifurcating the main body 1 of the UAV). Two arms 100, 101 extend from the front portion 10 of the main body 1, and one arm 102 extends from the rear portion 11 of the main body 1. In embodiments of the present disclosure, each of the arms 100, 101, 102 is equipped with a rotor 100a, 101a, 102a, respectively, wherein each of the rotors 100a, 101a, 102a includes a DC motor 100b, 101b, 102b, respectively, wherein each motor 100b, 101b, 101b operates rotation of a propeller 100c, 101c, 102c, respectively. Each rotor 100b, 101b, 102b is connected to each of the arms 100, 101, 102 by a base 100d, 101d, 102d, respectively. The propellers 100c, 101c, 102c may each have two or more blades. In embodiments of the present disclosure, each of the propellers 100c, 101c, 102c may be a fixed blade propeller attached to each rotor rotor 100a, 101a, 102a, respectively, such that all three propellers are aligned on a common plane.

Figure 3A:
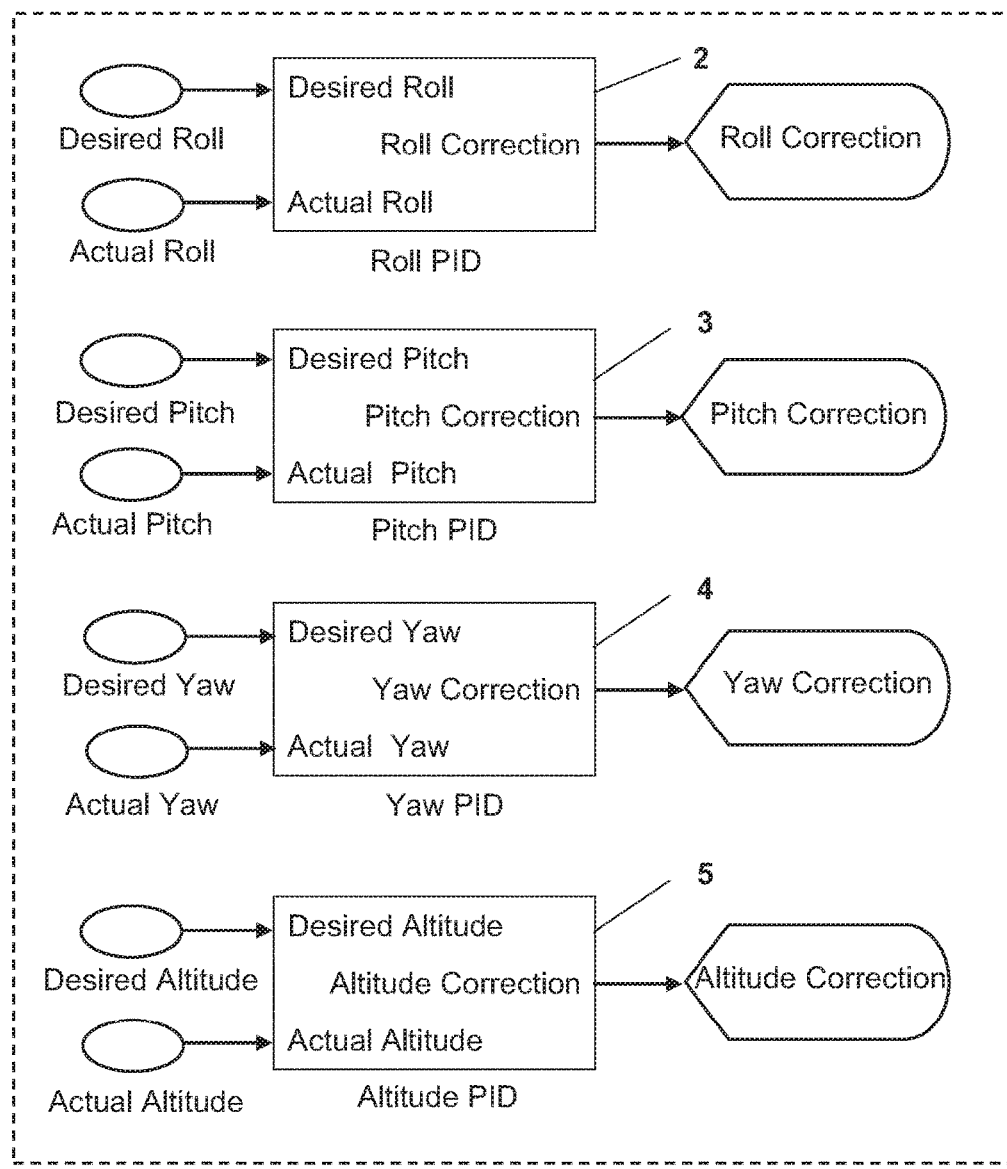
FIG. 3A illustrates a block diagram showing inputs and outputs of controllers of a UAV system configured in accordance with embodiments of the present disclosure.
Figure 3B:
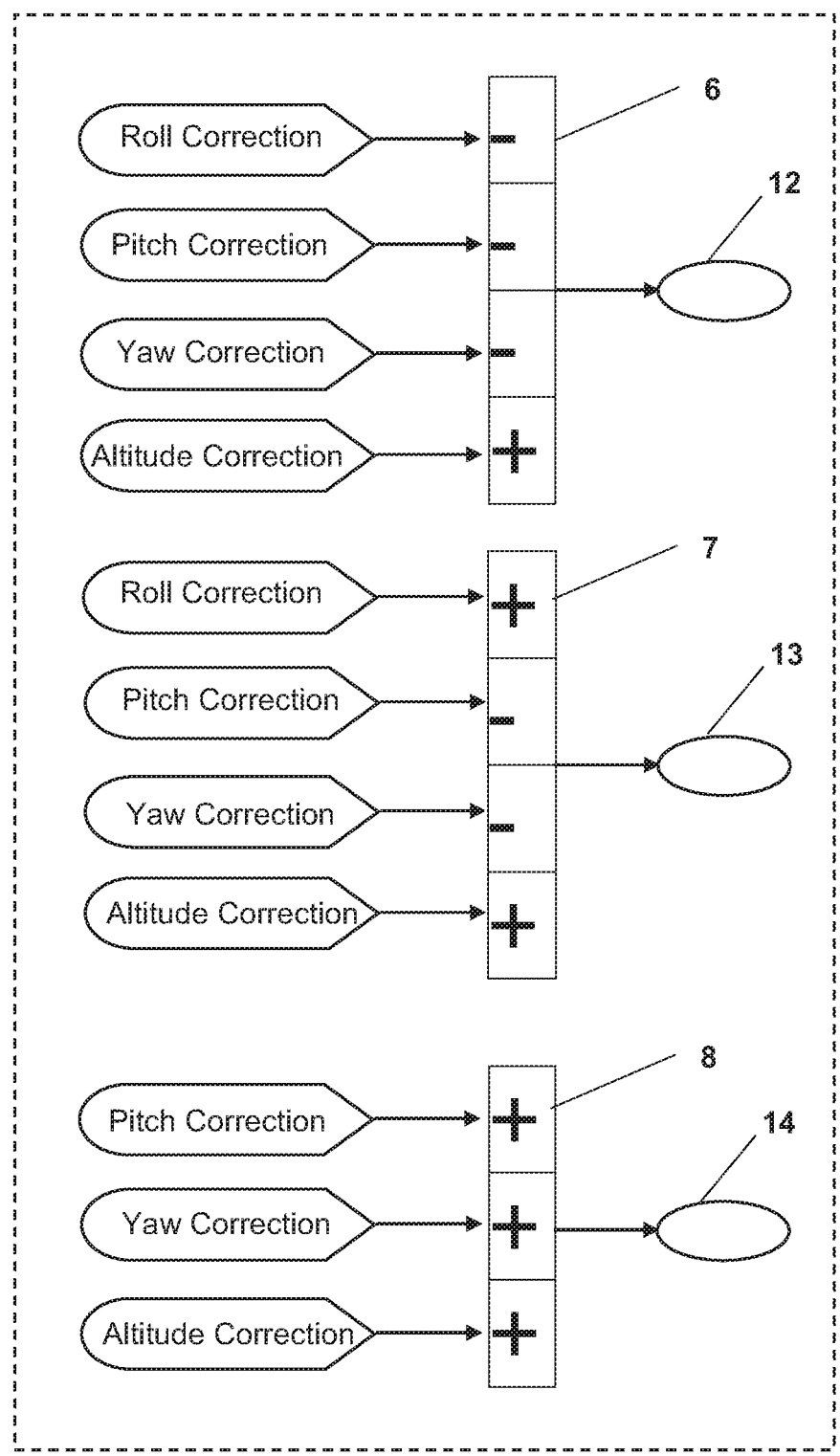
FIG. 3B illustrates a block diagram showing inputs and outputs of command mixers of a UAV system configured in accordance with embodiments of the present disclosure.

FIGS. 3A and 3B illustrate an avionics control system of the UAV. The avionics control system may include two components: the PID controllers 2, 3, 4, 5 and the three motor command mixers 6, 7, 8. Each PID controller calculates the difference between the feedback and the reference and tries to eliminate error. The output of each controller is mixed in the command mixers 6, 7, 8 to produce the desired pulse width modulation ("PWM") signals and send them to the motor controllers to achieve the desired motor speed for each of the motors for the rotors.

Referring to FIG. 3A, embodiments of the present disclosure further include a plurality of Proportional-Integral-Differential ("PID") controllers (for example, four controllers 2, 3, 4, 5), wherein such controllers are responsible for controlling the system's roll, pitch, yaw, and altitude, respectively. As illustrated in FIG. 3B, the UAV system, in embodiments of the present disclosure, includes a plurality of command mixers (for example, three command mixers 6, 7, 8), wherein the mixers 6, 7 mix the outputs of the controllers 2, 3, 4, 5, respectively, while the mixer 8 mixes the outputs of the controllers 3, 4, 5.

Embodiments of the present disclosure also include a plurality of rotor speed controllers (for example, three controllers 12, 13, 14 to control the rotors 100a, 101a, 102a, respectively). The controllers 12, 13, 14 may include microcontrollers.

In the UAV system in embodiments of the present disclosure, yaw is adjusted to enable lateral maneuvering with minimal pitch alternation that does not affect the UAV's stability, since the torque produced by the rear rotor 102a is double the torque produced by either of the rotors 100a, 101a, and the execution rate of the pitch PID controller 3 is higher than the yaw PID controller 4.

In embodiments of the present disclosure, the arms 100, 101 may be substantially aligned by the same angle (θ) with respect to the axis X-X, while the arm 102 may be substantially parallel to the axis X-X.

In the UAV system of embodiments of the present disclosure, the DC motors 100b, 101b, 102b may be brushless out runner type DC motors, wherein such motors have a substantially high frequency response.

Figure 2:
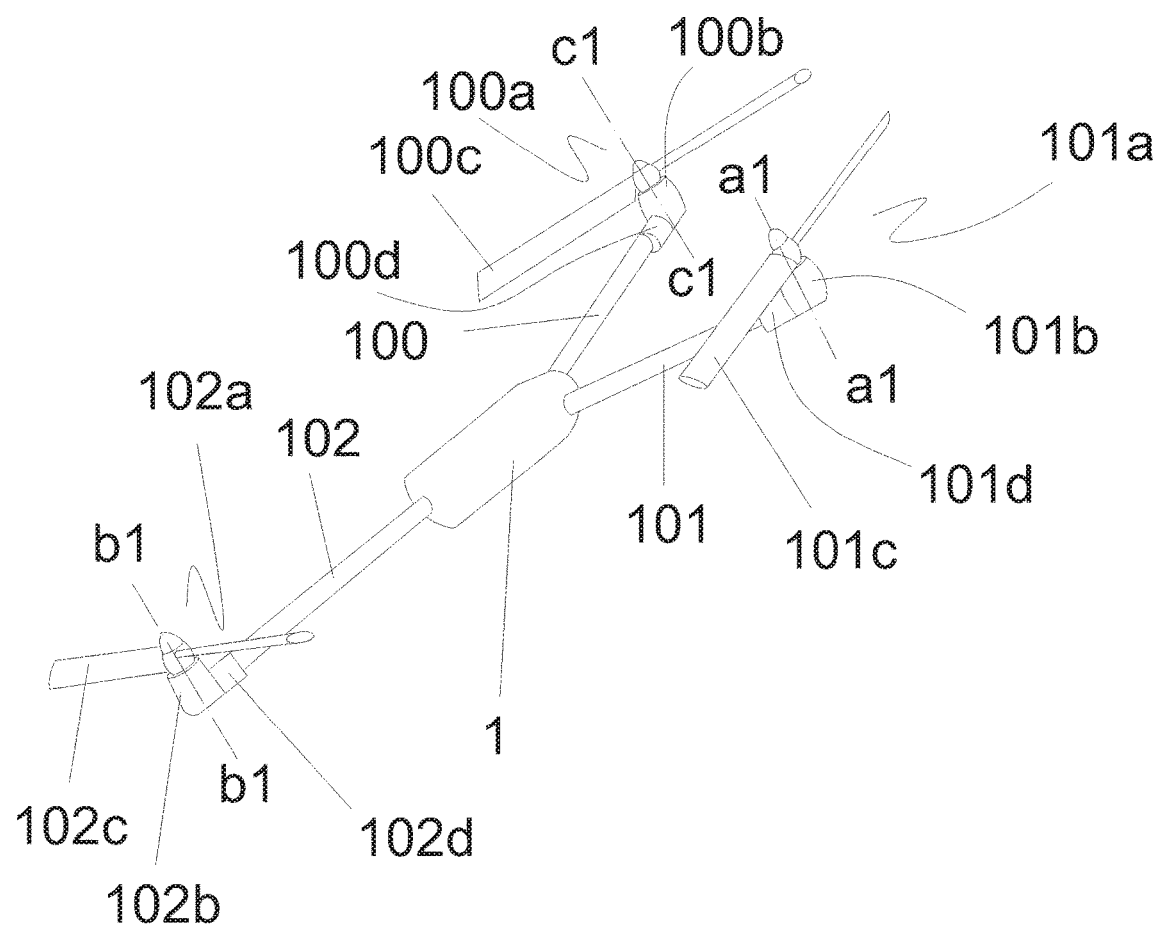
FIG. 2 illustrates a perspective view of a UAV system configured in accordance with embodiments of the present disclosure.

As illustrated in FIG. 2, each of the propellers 100c, 101c, 102c rotates about a corresponding axis, c1-c1, a1-a1, b1-b1, respectively, wherein such axes represent central lines of the DC motors 100b, 101b, 102b, respectively.

In embodiments of the present disclosure, the propellers 100c, 101c rotate in a similar direction (i.e., clockwise or counterclockwise), while the propeller 102c rotates in an opposite direction to propellers 100c, 101c, such that the adverse torque forces and gyroscopic moment forces are reduced or even cancelled. This leads to yaw moment control.

In the UAV system of embodiments of the present disclosure, the propellers 100c, 101c, 102c may rotate initially at substantially equivalent rotational speeds, wherein such speeds are controlled by the controllers 2, 3, 4, 5. However, the relative rotational speeds of the propellers 100c, 101c, 102c can be varied by the controllers 2, 3, 4, 5 in order to maintain altitude and attitude stability. In embodiments of the present disclosure, the rotational speeds of the propellers 100c, 101c, 102c are variable in order to increase or decrease thrust or propulsion of the UAV and to improve stability.

The UAV system of embodiments of the present disclosure achieves yaw stability control by manipulating the rotational speeds of the propellers at each DC motor 100b, 101b, 102b to control the attitude of the UAV and to make it capable of hovering and lateral maneuvering, thus eliminating the need for using coaxial rotors or an additional servo-motor. In embodiments of the present disclosure, since the rotor 102a may be configured to produce about double the torque produced by either of the rotors 100a and 101a, and since the execution rate of the pitch PID controller 3 is higher than the execution rate of the yaw PID controller 4, a pitch angle may be updated more rapidly than a yaw angle drift. A result will be a portion of a degree pitch oscillation and a portion of a degree yaw drift that is corrected by the control system less occasionally than the pitch correction. In embodiments of the present disclosure, the mechanical specifications, propeller dimensions, motor dimensions, and power requirements of rotor 102a are higher than those of rotor 101a and rotor 100a in order to achieve the required torque of rotor 102a.

In order to stabilize the UAV of embodiments of the present disclosure, the thrust (T) obtained from rotor 102a relates to the angle 2θ between the arms 100 and 101 according to the formula:

$$T_{102a} = (T_{101a} + T_{100a}) * \cos(\theta)$$

where θ is the angle between either of the arms 100 or 101 with the central axis X-X.

In embodiments of the present disclosure, the feedback signals regarding the system's actual roll, yaw, and pitch may be obtained from well-known gyroscopes and accelerometers (not shown), wherein such gyroscopes and accelerometers may be operably connected to the controllers 2, 3, 4.

In embodiments of the present disclosure, the feedback signal related to the system's actual altitude relative to the ground may be provided by a well-known sonar sensor (not shown) if the operating altitude of the system is less than a predetermined distance (for example, 6 meters). But, if the operating altitude of the system is equal to or greater than the predetermined distance, then a well-known pressure sensor (not shown) may be used to provide feedback on the altitude. The sonar or the pressure sensors may be operably connected to the controller 5.

In embodiments of the present disclosure, a power source for the system, the controllers 2, 3, 4, 5, the command mixers 6, 7, 8, as well as the gyroscopes, accelerometers, and pressure sensors, may be enclosed in the cavity of the main body 1. The sonar sensor may be installed on a bottom surface of the main body 1.

Figure 4:
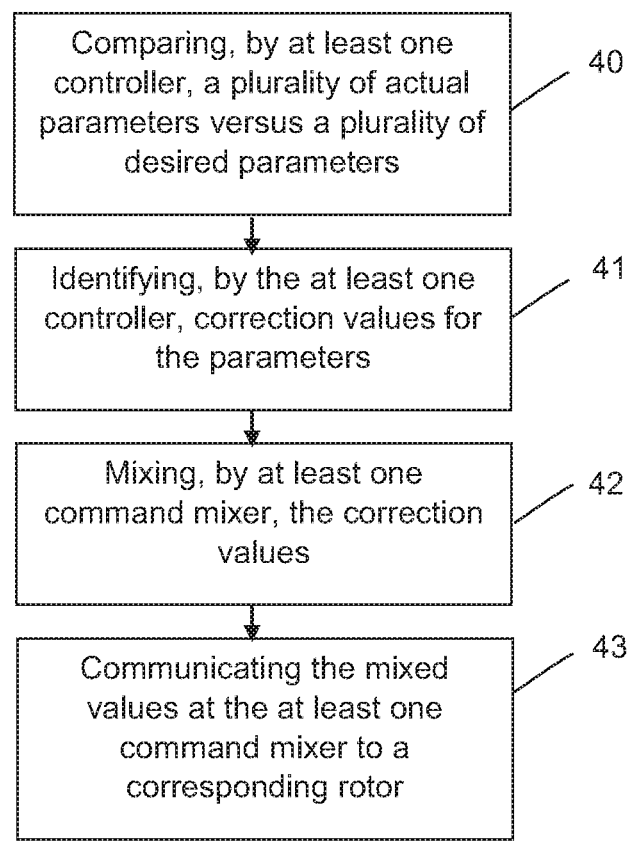
FIG. 4 illustrates a flowchart of a method for controlling a UAV system configured in accordance with embodiments of the present disclosure.

Reference is now being made to FIG. 4, which represents a flowchart of a method for controlling a UAV, configured in accordance with embodiments of the present disclosure, which makes the UAV capable of hovering and lateral maneuvering at adjustable altitudes.

In process block 40, one or more of the controllers 2, 3, 4, 5 compares its respective actual parameter versus a desired parameter. In process block 41, the one or more of the controllers 2, 3, 4, 5 identifies correction values for the parameters. In process block 42, one or more of the command mixers 6, 7, 8 mixes the identified correction values. In process block 43, the mixed values are communicated by the one or more command mixers 6, 7, 8 to a corresponding rotor controller 12, 13, 14.

In embodiments of the present disclosure, the comparison between the actual and desired parameters may take place at the controllers 2, 3, 4, 5, wherein each controller may compare actual and desired values for one parameter only. The parameters may include the UAV roll, pitch, yaw, and altitude.

The UAV system of embodiments of the present disclosure may be autonomous, semi-autonomous, or remotely piloted in any suitable well-known manner. In embodiments of the present disclosure, values of the desired parameters may be pre-set by an operator (for example, a remote pilot or autopilot). For example, a desired parameter may originate from an operator's controller, such as a well-known remote controller, wherein such parameters are produced as a result of a manual manipulation of one or more joysticks, or equivalent activators. Alternatively, such desired parameters may be generated within such a remote controller as a result of a preprogrammed flight plan for the UAV. The UAV may therefore include well-known circuitry and electronics (which may be encased within the cavity of the main body 1) for wirelessly communicating with the remote controller. Or, a preprogrammed flight plan may be stored in a memory device within the UAV for operation by well-known circuitry and electronics communicating such desired parameters to the controllers 2, 3, 4, 5.

Referring to FIG. 3A, in embodiments of the present disclosure, the correction values may include roll correction, pitch correction, yaw correction, and altitude correction, wherein such correction values may be obtained from the difference (error) between the actual and the desired values (i.e., the error value) after being subjected to PID control algorithms implemented within the controllers 2, 3, 4, 5. As an example, for the pitch, roll, and yaw, the error may be:

error=desired angle−actual angle, where the desired angle may be set by the remote pilot or auto pilot, and the actual angle is read by a sensor on the UAV. The angles could be roll angle, pitch angle, and/or yaw angle. In the case of altitude, the error may be:

error=desired altitude−actual altitude, wherein the desired altitude is set by the remote pilot or auto pilot, and the actual altitude is read by a sensor.

In the PID control algorithms, the error value may be multiplied by a proportional gain Kp (P controller) to get a "P" correction (P correction=Kp*error value), differentiated and multiplied by a differential gain Kd (D controller) to get a "D" correction (D correction=Kd*derivative of the error value), and integrated and multiplied by an integral gain Ki (I controller) to get an "I" correction (I correction=Ki*integration of the error value). Then, these P, I, D corrections are added to obtain the required overall correction values for each of the parameters.

For example, repeated control loops (i.e., a control loop may be a set of computer executable software program code instructions performed in order to compute the P, I, D correction values) of the PID control algorithm are configured to continuously calculate the corrections reading the desired angle, reading the actual angle, calculating the error value, integrating the error value, differentiating the error value, multiplying the error value with a Kp gain to produce a P correction, multiplying the integrated error value with a Ki gain to produce an I correction, multiplying the differentiated error value with a Kd gain to produce a D correction, and adding up all three corrections (P, I, and D corrections) to produce the correction for each of the control loops, wherein the correction of each of the control loops is the pitch, roll, yaw, or altitude correction, as the case may be. Then, the corrections are sent to the mixers. A frequency of the control loops is how many times each control loop is repeated during a unit of time.

As shown in FIG. 3A, the correction values may be the output of the controllers 2, 3, 4, 5, while the desired and the actual values may be the inputs of such controllers 2, 3, 4, 5.

In embodiments of the present disclosure, the command mixer 6 may add the altitude correction value, but subtract the roll, pitch, and yaw correction values in order to produce its output value. The output value of the command mixer 6 may be transmitted to the controller 12.

In embodiments of the present disclosure, the command mixer 7 may add up the roll and altitude correction values, but subtract the pitch and yaw correction values in order to produce its output value. The output value of the command mixer 7 may be transmitted to the controller 13.

In embodiments of the present disclosure, the command mixer 8 may add up the pitch, yaw, and altitude correction values, and disregard the roll correction value in order to produce its output value. The output value of the command mixer 8 may be transmitted to the rotor 102a controller 14. The command mixer 8 may disregard the roll correction value since the rotor 102a has no effect on the system's roll.

In embodiments of the present disclosure, the altitude correction value may be added to the mixers 6, 7, 8, since the altitude correction value affects the motors 100b, 101b, 102b substantially equally by increasing or decreasing rotational speed (rpm) to increase or decrease altitude.

In embodiments of the present disclosure, the roll correction value may be added to the controller 12 and subtracted from the controller 13 to increase the rotational speed (rpm) of the rotor 100a and decrease the rotational speed (rpm) of the rotor 101a. Having such variation in speeds may make the rotor 100a of a higher elevation than the elevation of the rotor 101a, wherein such variation may result in rolling the UAV about the axis X-X and start moving in the direction of the rotor 100a (if the roll correction was negative, the UAV will move to the direction of the rotor 101a).

In embodiments of the present disclosure, the pitch correction value may be added to the controller 14 and subtracted from the controllers 12, 13 to result in pitching the UAV downwards or upwards causing a forward or backward movement of the UAV, respectively.

In embodiments of the present disclosure, the yaw correction may be added to the controller 14 while subtracted from the controllers 12, 13. Given that yaw control loop will produce such a correction less frequently than the pitch correction of the pitch control loop, and given that the torque of the rotor 102a is twice the torque of either of the rotors 100a, 101a, this may result in making the UAV to yaw around itself clockwise or counter-clock wise, depending upon the sign (positive or negative) of the yaw correction.

In embodiments of the present disclosure, the output values of the command mixers 6, 7, 8 may be a set of desired Pulse Width Modulation ("PWM") commands in order to adjust the rotational speeds (rpm) of the rotors 100a, 101a, 102a.

In embodiments of the present disclosure, the frequencies (i.e., the number of times the aforementioned control loop is executed during a unit of time) for executing the roll and pitch control loops may be substantially equal, but may be substantially higher than the frequency for executing the yaw control loop.

In certain embodiments of the present disclosure, the execution rate of the pitch control loop is higher than the execution rates of both roll and yaw control loops. Also, the execution rate of the roll control loop may be higher than the execution rate of the yaw control loop.

The following example illustrates embodiments of the present disclosure without, however, limiting the scope thereof.

A simulation was performed using the model parameters and the PID gain values shown in Tables 1 and 2, respectively.

TABLE 1

Tri-rotor model parameters.

| Parameters | Values |
| --- | --- |
| Mass (m) | 2.375 kg |
| Moment of inertia ($I_{xx}$) | $51.2*10^{-3}$ kg · m$^2$ |
| Moment of inertia ($I_{yy}$) | $44.1*10^{-3}$ kg · m$^2$ |
| Moment of inertia ($I_{zz}$) | $3.8*10^{-3}$ kg · m$^2$ |
| Arm length (l) | 0.288 m |
| Gravitational acceleration (g) | 9.81 m/s$^2$ |
| Rotor inertia ($J_r$) | $6*10^{-5}$ kg · m$^2$ |
| Thrust coefficient ($b_1$) | $7.8*10^{-5}$ N · s$^2$ |
| Thrust coefficient ($b_2$) | $13.3*10^{-5}$ N · s$^2$ |
| Drag coefficient ($d_1$) | $7.5*10^{-7}$ N · s$^2$ |
| Drag coefficient ($d_2$) | $15*10^{-7}$ N · s$^2$ |

The six degree of freedom rigid body motion equations are expressed as follows:
Kinematic equations:

$$\phi = p + \tan\theta(q\sin\phi + r\cos\phi),$$

$$\theta = q\cos\phi - r\sin\phi,$$

$$\psi = (q\sin\phi + r\cos\phi)\sec\theta,$$

Tri-rotor moment inputs:

$$U_x = b_1(\Omega_1^2 - \Omega_2^2)l,$$

$$U_T = b_1(\Omega_1^2 + \Omega_2^2) + b_2\Omega_3^2,$$

$$U_y = b_1(\Omega_1^2 + \Omega_2^2)l\cos\beta - b_2\Omega_3^2 l,$$

$$U_z = ld_1(\Omega_1^2 + \Omega_2^2) - ld_2\Omega_3^2,$$

$U_T$, $U_x$, $U_y$, $U_z$ are the total thrust, rolling moment, pitching moment and yawing moment, respectively, and b, d are the thrust factor and the drag factor, respectively.

Equations of motion:

$$I_{xx}\ddot{\phi}=\dot{\theta}\dot{\psi}(I_{yy}-I_{zz})+J_r\dot{\theta}\Omega_r+U_x,$$

$$I_{yy}\ddot{\theta}=\dot{\phi}\dot{\psi}(I_{zz}-I_{xx})-J_r\dot{\phi}\Omega_r+U_y,$$

$$I_{zz}\ddot{\psi}=\dot{\theta}\dot{\phi}(I_{xx}-I_{yy})+J_r\Omega_r+U_z,$$

$$m\ddot{z}=mg-(\cos\psi\cos\phi)U_T,$$

$$m\ddot{x}=(\sin\psi\sin\phi+\cos\psi\sin\theta\cos\phi)U_T,$$

$$m\ddot{y}=(-\cos\psi\sin\phi+\sin\psi\sin\theta\cos\phi)U_T,$$

TABLE 2

PID controller gain values

|  | $K_p$ | $K_d$ | $K_i$ |
|---|---|---|---|
| Roll | 6.6667 | 3.2456 | 0.02 |
| Pitch | 13.3334 | 11.18075 | 0 |
| Yaw | 0.5 | 0.147225 | 0 |
| Altitude | 10.5409 | 9.1423 | 0.01 |

In embodiments of the present disclosure, each of the motors has a high frequency response. Higher motor frequency response may result in lower oscillation in the pitch angle due to the interdependencies of pitch and yaw controllers during command signal mixing. Two values of frequency response were simulated, the first value was 12 Hz, and the second value was 50 Hz. During such a simulation, the position (X, Y) and altitude (Z) of the tri-rotor system were held constant. The results indicated that the system stability and behavior were better at the higher motor frequency response of 50 Hz. Moreover, the amount of drift in X and Y Cartesian coordinates as well as the oscillation in the roll, pitch, and yaw angles were less at the higher motor frequency response (the motor frequency response relates to how fast the PWM commands may be sent to a motor to change its rotational speed and how fast the motor will respond accordingly).

As noted herein, aspects of the present disclosure may be embodied as various processes, methods, algorithms, etc. for performing the various functions described herein, including with respect to FIGS. 3A, 3B, and 4, wherein such various processes, methods, algorithms, etc. may be implemented in hardware, software, or a combination thereof. As such, aspects of the present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device, such as the aforementioned microcontrollers or microprocessors, which may implement any one or more of the controllers 2, 3, 4, 5, command mixers 6, 7, 8, and/or the controllers 12, 13, 14. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present disclosure may be assembler instructions, instruction-set-architecture ("ISA") instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the UAV system, partly on the UAV system, as a stand-alone software package, partly on the UAV system and partly on a remote computer, or entirely on the remote computer or server. In the latter scenario, the remote computer may be connected to the UAV system through any type of network, including a wireless network, a local area network ("LAN") or a wide area network ("WAN"), or the connection may be made to an external computer (for example, through the Internet using an Internet Service Provider). In some embodiments, electronic circuitry including, for example, a microcontroller, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present disclosure.

Aspects of the present disclosure are described herein with reference to a flowchart and block diagrams of methods, apparatus (systems), and computer program products according to embodiments of the disclosure. It will be understood that each block of the flowchart and/or block diagrams, and combinations of blocks in the flowchart and/or block diagrams, can be implemented by computer readable program instructions.

These computer readable program instructions may be provided to a processor of a microcontroller, general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a microcontroller, computer, other programmable data processing apparatus, or other device to cause a series of operational steps to be performed on the microcontroller, computer, other programmable apparatus, or other device to produce a computer implemented process, such that the instructions which execute on the microcontroller, computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart, and combinations of blocks in the block diagrams and/or flowchart, can be implemented by special purpose hardware-based systems that perform the specified functions or acts or carry out combinations of special purpose hardware and computer instructions.

While the disclosure has been described in details and with reference to embodiments thereof, it will be apparent to one skilled in the art that various additions, omissions, and modifications can be made without departing from the spirit and scope thereof.

Although the above description contains much specificity, these should not be construed as limitations on the scope of the disclosure but is merely representative of the embodiments thereof. The above described embodiments are intended to be exemplary only.

LIST OF SYMBOLS $\theta$ Pitch angle
$\phi$ Roll angle
$\psi$ Yaw angle
l Horizontal distance from center of propeller to center of gravity
$I_{xx,yy,zz}$ Moments of inertia
J Rotor inertia
m Overall mass
g Gravity acceleration
x, y, z Position in body coordinate frame
X, Y, Z Position in earth coordinate frame
$\Omega$ Propeller angular rate
$\Omega_r$ Overall residual propeller angular speed
$\beta$ The angle between x body axis and rotor one arm
p, q, r Body angular rates
C Friction coefficient
$\tau$ Time constant

The invention claimed is:

1. A method for controlling an unmanned aerial vehicle ("UAV") system comprising:
comparing, by at least one controller, a plurality of actual parameters versus a plurality of desired parameters, the actual and desired parameters including altitude, roll, pitch, and yaw of the UAV system;
identifying, by the at least one controller, correction values for the compared parameters;
mixing, by at least one command mixer, the correction values;
communicating the mixed values at the at least one command mixer to a corresponding rotor controller of the UAV system;
stabilizing the UAV by obtaining thrust (T) from the third rotor relative to an angle $2\theta$ between the first and second arms by formula (1):

$$T_{102a}=(T_{101a}+T_{100a})*\cos(\theta) \quad (1); \text{ and}$$

executing a pitch PID controller of the UAV at a higher rate than an execution rate of a yaw PID controller of the UAV,
wherein $T_{100a}$ is a thrust of the first rotor, $T_{101a}$ is a thrust of the second rotor, $T_{102a}$ is the thrust of the third rotor, $\theta$ is the angle between either of the first arm or the second arm and a line of symmetry,
wherein a first command mixer adds an altitude correction value and subtracts roll, pitch, and yaw correction values to send to a first one of the rotor controllers,
wherein a second command mixer adds the roll and altitude correction values but subtracts the pitch and yaw correction values to send to a second one of the rotor controllers,
wherein the UAV system comprises:
a main body having a front portion and a rear portion, wherein the main body is bifurcated by the line of symmetry;
first, second, and third similar arms extending radially from the main body, the first and second arms extending from the front portion and are positioned relative to each other on opposite sides of the line of symmetry, and the third arm extending from the rear portion along the line of symmetry; and
a single rotor positioned on each of the first, second, and third arms;
wherein the first one of the rotor controllers is configured to control rotational speed of the single rotor positioned on the first arm, the second one of the rotor controllers being configured to control rotational speed of the single rotor positioned on the second arm, and the third one of the rotor controllers being configured to control rotational speed of the single rotor positioned on the third arm,
wherein a third command mixer adds the pitch, yaw, and altitude correction values and disregards the roll correction value to send to a third one of the rotor controllers, and
wherein the third one of the rotor controllers is configured to control rotational speed of the single rotor positioned on the third arm.

2. The method of claim 1, wherein the actual parameters are obtained from a plurality of sensors selected from a group consisting of gyroscopes, accelerometers, sonar, and pressure sensors.

3. The method of claim 1, wherein the correction values are a result of a difference between values of the desired and actual parameters after being subjected to a Proportional-Integral-Differential ("PID") control loop.

4. The method of claim 1, further comprising:
obtaining the actual parameters from at least one gyroscope sensor.

5. The method of claim 1, further comprising:
obtaining the actual parameters from at least one accelerometer.

6. The method of claim 1, further comprising:
obtaining the actual parameters from at least one sonar sensor.

7. The method of claim 1, further comprising:
obtaining the actual parameters from at least one pressure sensor.

8. The method of claim 1, wherein control of stability and maneuvering of the UAV is achieved by only manipulating the rotational speeds of the rotors at each rotor.

9. The method of claim 1, wherein the control of the stability and the maneuvering is achieved with no coaxial rotor and no extra servo-motor to control the yaw.

10. The method of claim 1, wherein two of the rotors rotate in the same direction and the third rotor rotates in the opposite direction.

11. The method of claim 1, further comprising:
controlling the stability yaw by manipulating rotational speeds of the rotors at each DC motor, thereby controlling UAV altitude and allowing hovering and lateral maneuvering, without using coaxial rotors and without using an additional servo-motor.

12. The method of claim 1, further comprising:
operating the third rotor to produce about double the torque produced by the first rotor and about double the torque produced by second rotor.

13. The method of claim 1, further comprising:
updating a pitch angle of the UAV more rapidly than a yaw angle drift of the UAV.

14. The method of claim 1, further comprising:
correcting at least a portion of a degree pitch oscillation more rapidly than at least a portion of a degree yaw drift by the control system.

15. The method of claim 1, wherein
configuring one or more mechanical specifications, propeller dimensions, motor dimensions, and/or power requirements of the third rotor to be higher than those of the first rotor and the second rotor.

16. The method of claim 15, wherein the configuring achieves a higher torque of the third rotor, and
wherein the UAV has only three arms.

17. The method of claim 1, comprising
multiplying an error value by a proportional gain Kp (P controller) to get a P correction, the P correction being Kp×the error value;
differentiating and multiplying the P correction by a differential gain Kd (D controller) to get a D correction, the D correction being Kd×a derivative of the error value; and
integrating and multiplying the D correction by an integral gain Ki (I controller) to get an I correction, the I correction being Ki×an integration of the error value; then
adding the P correction, the I correction, and the D correction to obtain overall correction values for each of the parameters.

18. The method of claim 17, wherein the overall correction values are a result of a difference between values of the desired and actual parameters after being subjected to a Proportional-Integral-Differential control loop.

19. The method of claim 1, wherein output values of the command mixers are a set of desired Pulse Width Modulation commands which adjust rotational speeds of one or more of the rotors.

\* \* \* \* \*